US011958702B2

(12) United States Patent
Salter et al.

(10) Patent No.: US 11,958,702 B2
(45) Date of Patent: Apr. 16, 2024

(54) AUTONOMOUS VEHICLE CARGO BIN LOADING

(71) Applicant: Ford Global Technologies, LLC, Dearborn, MI (US)

(72) Inventors: Stuart C. Salter, White Lake, MI (US); Adam Carlson, Ann Arbor, MI (US); Peter Phung, Windsor (CA); Hussein Berry, Dearborn, MI (US); Benjamin Richer, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 566 days.

(21) Appl. No.: 17/318,192

(22) Filed: May 12, 2021

(65) Prior Publication Data

US 2022/0363494 A1 Nov. 17, 2022

(51) Int. Cl.
*B65G 67/04* (2006.01)
*B60P 3/00* (2006.01)
*B60Q 3/30* (2017.01)
*B60Q 5/00* (2006.01)
*G01S 13/06* (2006.01)
*G06K 19/06* (2006.01)
*G06N 20/00* (2019.01)
(Continued)

(52) U.S. Cl.
CPC .............. *B65G 67/04* (2013.01); *B60P 3/007* (2013.01); *B60Q 3/30* (2017.02); *B60Q 5/00* (2013.01); *G01S 13/06* (2013.01); *G06K 19/06028* (2013.01); *G06N 20/00* (2019.01); *G06Q 10/0832* (2013.01); *G06Q 10/087* (2013.01)

(58) Field of Classification Search
CPC ..... G07F 17/12; G07F 17/13; G06Q 10/0832; B60P 3/007
See application file for complete search history.

(56) References Cited

U.S. PATENT DOCUMENTS 8,047,432 B2  11/2011  Breed
9,725,241 B2   8/2017  Swinkels et al.
(Continued)

OTHER PUBLICATIONS

HTE Automation Tech Team, "Autonomous Mobile Industrial Robot", HTE Automation Technologies, https://www.hteautomation.com/item/index/Autonomous%20Mobile%20Robots, 2021, 2 pages.
(Continued)

*Primary Examiner* — Timothy R Waggoner
(74) *Attorney, Agent, or Firm* — Brandon Hicks; Eversheds Sutherland (US) LLP (57) ABSTRACT

A method for controlling a vehicle includes determining, via a processor disposed in communication with a sensory device disposed in an interior surface of a cargo bin of a delivery vehicle, that a first package is loaded in the cargo bin, causing to scan, via the processor, a bar code disposed on an exterior surface of the first package, causing to measure, via a RADAR sensory device disposed in the cargo bin, dimensional information associated with the first package, determining, based on the dimensional information, that the cargo bin is loaded at full capacity, causing to illuminate an output device indicative that the cargo bin is loaded at full capacity, determining, via the processor, a cargo bin door closed status and generating, via the processor, an output indicating whether the vehicle is ready for delivery.

20 Claims, 4 Drawing Sheets

(51) Int. Cl.
   *G06Q 10/0832*   (2023.01)
   *G06Q 10/087*    (2023.01)

(56) References Cited

U.S. PATENT DOCUMENTS

| | | | |
|---|---|---|---|
| 9,745,130 B1* | 8/2017 | Rawal | G06Q 10/0875 |
| 2007/0071585 A1 | 3/2007 | Henkel | |
| 2015/0130592 A1* | 5/2015 | Lakshminarayanan | G06K 7/10297 340/10.1 |
| 2017/0140550 A1* | 5/2017 | Zhang | G06T 7/50 |
| 2018/0341913 A1* | 11/2018 | Ching | G06Q 10/0832 |
| 2019/0004539 A1 | 1/2019 | Yu et al. | |
| 2019/0180354 A1* | 6/2019 | Greenberger | G07F 17/13 |
| 2022/0084340 A1* | 3/2022 | Hall | G06Q 10/06315 |

OTHER PUBLICATIONS

H. Flaming, "Autonomous Vehicles and Autonomous Driving in Freight Transport", Springer Link, May 22, 2016, 25 pages.

* cited by examiner

AUTONOMOUS VEHICLE CARGO BIN LOADING

TECHNICAL FIELD

The present disclosure relates to automated package loading systems, and more particularly, to an autonomous vehicle cargo vehicle bin loading system.

BACKGROUND

Compartmentalization in moving goods vehicle design is a critical enabler for allowing a vehicle to onboard and deliver multiple orders in a single optimized route. Some conventional cargo bin loading systems may provide automated bin loading. However, known cargo bin loading systems may not determine, without the assistance of a human loader, whether a cargo bin is utilized properly with respect to cargo placement, cargo bin utilization (e.g., complete loading of the cargo bin to capacity), and working with unknown package sizes. More particularly, state of the art cargo bin loading systems may work only with theoretical loading calculations based on known package sizes, and may not have machine vision guidance that determines actual in-storage conditions with respect to loader efficiency and full utilization of bin capacity given random package sizes being loaded into the cargo bins.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Illustrative Embodiments

The disclosure will be described more fully hereinafter with reference to the accompanying drawings, in which example embodiments of the disclosure are shown, and not intended to be limiting.

Figure 1:
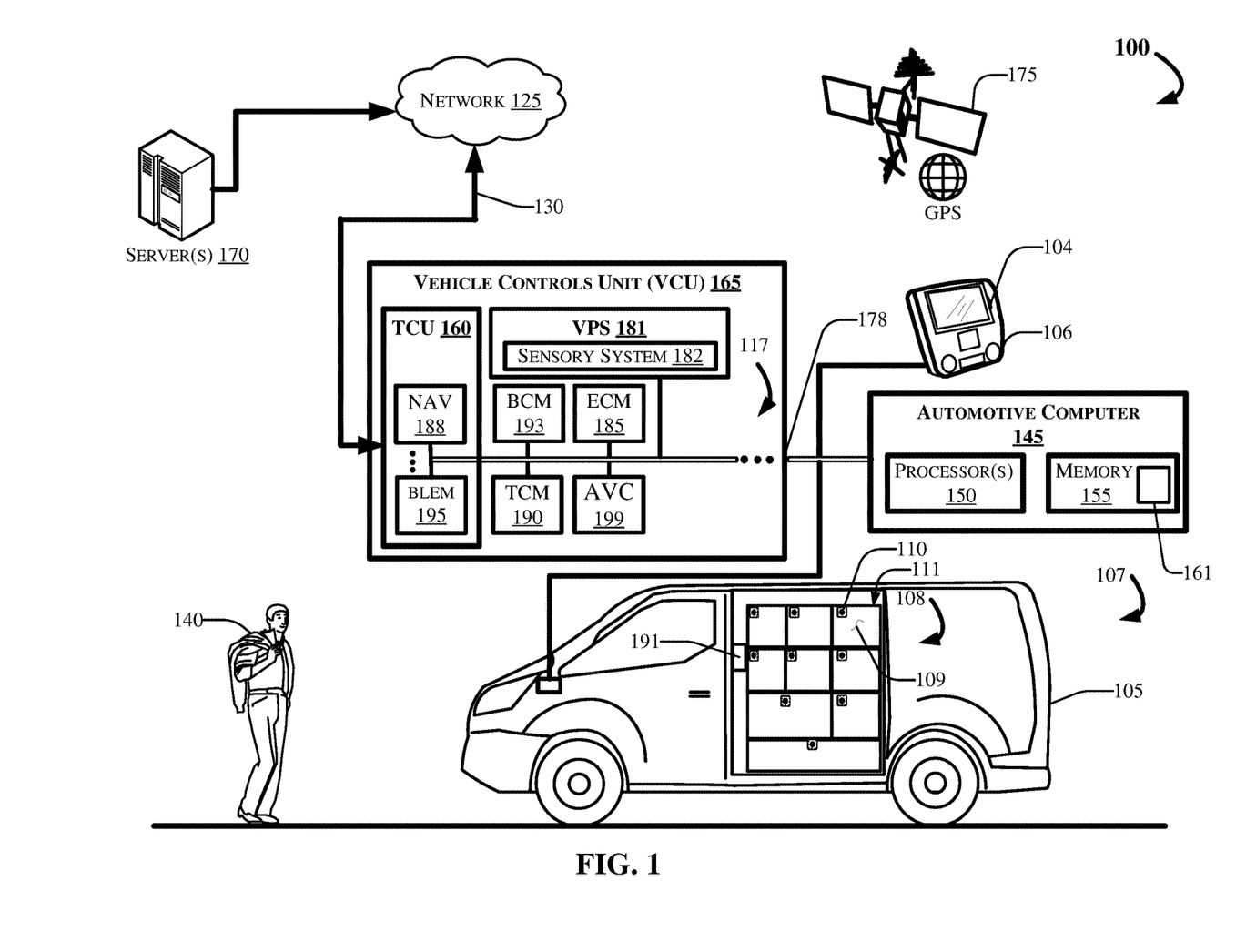
FIG. 1 depicts an example computing environment and delivery vehicle with which techniques and structures for providing the systems and methods disclosed herein may be implemented.

FIG. 1 depicts an example computing environment 100 that can include a vehicle 105. The vehicle 105 may include an automotive computer 145, and a Vehicle Controls Unit (VCU) 165 that can include a plurality of electronic control units (ECUs) 117 disposed in communication with the automotive computer 145. The vehicle 105 may include a vehicle cargo bin loading system 107 configured and/or programmed to determine package dimensions of packages stored inside of on-vehicle cargo storage bins, use RADAR and other onboard sensory devices to evaluate real-time storage bin utilization, and provide instructive output that indicates when cargo bin arranging may be necessary to fully utilize the cargo space onboard the delivery vehicle 105.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a delivery cargo van, the vehicle 105 may take the form of another passenger or commercial automobile, such as, for example, a car, a truck, a sport utility, a crossover vehicle, a box truck, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes an HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes, which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

According to embodiments of the present disclosure, the vehicle cargo bin loading system 107 may be configured and/or programmed to operate with a vehicle having no autonomous vehicle features at all, and/or may include vehicles having any level of autonomous driving features from a Level-1 to Level-4 autonomous vehicle controller (AVC) 199. Accordingly, vehicle cargo bin loading system 107 may provide some aspects of human control to the vehicle 105, when the vehicle is configured as an AV. For example, the vehicle cargo bin loading system 107 may cause the AVC 199 to slow, stop, or prevent travel if one or more of the cargo bay doors are open when an expected state is a closed position.

The TCU 160 may include one or more transmitters (not shown in FIG. 1) that may communicate with the server(s) 170 using a wireless communication network such as, for example, the one or more network(s) 125. The wireless connection(s) 130 are depicted in FIG. 1 as communicating via the one or more network(s) 125, and via one or more wireless connection(s) 130. The wireless connection(s) 130 may include various low-energy protocols including, for example, Bluetooth®, Bluetooth® Low-Energy (BLE®), UWB, Near Field Communication (NFC), or other protocols.

The network(s) 125 illustrates an example communication infrastructure in which the connected devices discussed in various embodiments of this disclosure may communicate. The network(s) 125 may be and/or include the Internet, a private network, public network, or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the vehicle cargo bin loading system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a vehicle cargo bin loading system program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

Figure 2:
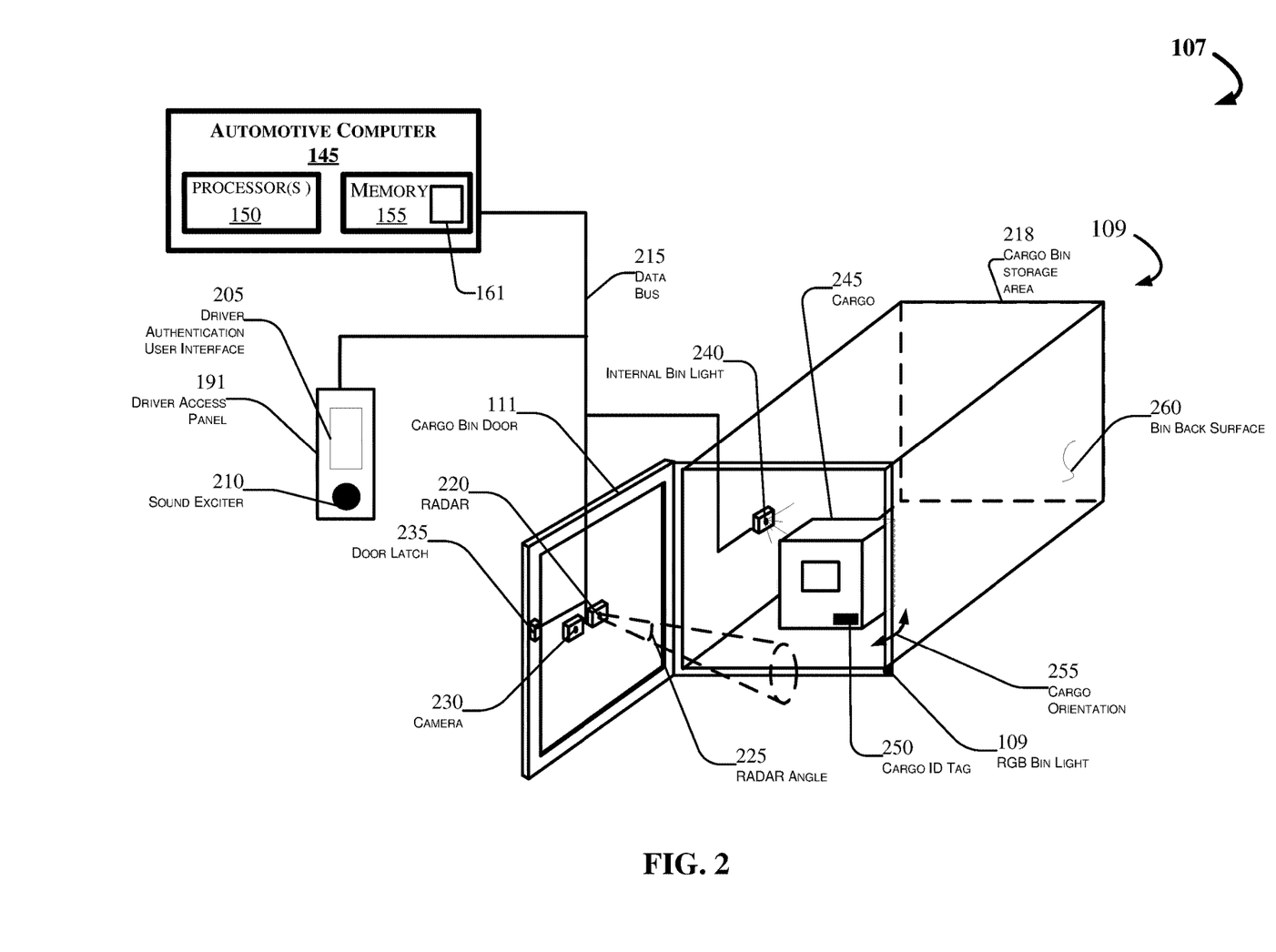
FIG. 2 depicts an example storage locker having a printed circuit board assembly with which methods disclosed herein may be implemented.

The autonomous vehicle cargo bin loading system program code 161 may include and/or communicate with a machine learning algorithm configured, programmed, and/or trained for performing aspects of the present disclosure. For example, the autonomous vehicle cargo bin loading system program code 161 may include a trained machine learning algorithm programmed for determining whether packages loaded inside of a cargo bin of a plurality of cargo bins 108 have packages loaded inside of the bins. The machine learning algorithm(s) may work in conjunction with one or more camera sensory systems (e.g., a camera such as that described with respect to FIG. 2) to measure package dimensions by identifying key measurement points on unknown (previously unseen by the machine learning algorithm) packages loaded within the cargo bins 108. For example, the machine learning algorithm may cause a camera 230 (as shown in FIG. 2), either alone or in conjunction with a RADAR sensory device 220 (also shown in FIG. 2) to determine measurement points of a package loaded in the bin, take multiple measurements of the package(s), determine package dimensions and volume, and use that information to evaluate whether the interior bin storage space has been adequately, inadequately, or improperly utilized. For example, the machine learning algorithm may determine whether a package has been placed properly in a cargo bin 109 interior, where the package (not shown in FIG. 1) is pushed all of the way to a rear wall (not shown in FIG. 1) of the cargo bin 109 such that an interior area closest to a cargo bin door 111 remains free and clear to load another package (not shown in FIG. 1) of suitable size for the remaining storage space. The machine learning algorithm, and other modules associated with the trained machine learning algorithm, may communicate information to the VCU 165 for output to the user 140 and/or to cause the vehicle 105 to alter a vehicle control such as vehicle actuation, braking, and other functions.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, and an Autonomous Vehicle Controller (AVC) 199, etc. The VCU 165 may further include and/or communicate with a Vehicle Perception System (VPS) 181, having connectivity with and/or control of one or more vehicle sensory system(s) 182.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 178. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The bus 178 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 178 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the vehicle cargo bin loading system 107, and/or the server(s) 170, etc.), and may also communicate with one another without the necessity of a host computer. The bus 178 may connect the ECUs 117 with the automotive computer 145 such that the automotive computer 145 may retrieve information from, send information to, and otherwise interact with the ECUs 117 to perform steps described according to embodiments of the present disclosure. The bus 178 may connect CAN bus nodes (e.g., the ECUs 117) to each other through a two-wire bus, which may be a twisted pair having a nominal characteristic impedance. The bus 178 may also be accomplished using other communication protocol solutions, such as Media Oriented Systems Transport (MOST) or Ethernet. In other aspects, the bus 178 may be a wireless intra-vehicle bus.

The VCU 165 may control various loads directly via the bus 178 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

For example, the VCU 165 may include the AVC 199. The AVC 199 may include a semi-autonomous or fully autonomous controller configured and/or programmed for vehicle control of the vehicle 105. It should be appreciated that aspects of autonomous vehicle control are well known in the art, and although outside of the scope of the present disclosure, may include partial or full autonomous vehicle control. In other aspects, AVC 199 may also be configured and/or programmed to control Level-1 through Level-4 autonomous driving features. The AVC 199 may connect with and/or include the VPS 181 and the vehicle cargo bin loading system 107, which may include internal and external sensory systems (collectively referred to as vehicle perception system 181). The vehicle sensory systems 182 may be configured and/or programmed to obtain sensor data usable for biometric authentication, and for performing driver assistances operations such as, for example, active parking, trailer backup assistances, adaptive cruise control and lane keeping, driver status monitoring, and/or other features.

In an example embodiment, the ECUs 117 may control aspects of vehicle operation and communication using inputs from human drivers, inputs from an autonomous vehicle controller, the vehicle cargo bin loading system 107, and/or via wireless signal inputs received via the wireless connection(s) 133 from other connected devices. The ECUs 117, when configured as nodes in the bus 178, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, power windows, doors, actuators, and other functionality, etc. The BCM 193 may be configured for vehicle energy management, exterior lighting control, wiper functionality, power window, and door functionality, heating ventilation and air conditioning systems, and driver integration systems. In other aspects, the BCM 193 may control auxiliary equipment functionality, and/or be responsible for integration of such functionality.

The vehicle cargo bin loading system 107 may further include one or more cargo bin(s) 108 disposed on the vehicle 105, which may be accessible from an exterior of the vehicle 105 through one or more Driver Access Panels (DAPs) 191. The cargo bins 108 may include one or more cargo bins 109 having an output indicator (e.g., a red-green-blue (RGB) bin light 110) disposed on an exterior surface of the cargo bin door 111.

The RGB bin light 110 may be and or include a Light Emitting Diode (LED) indicator light controllable by the processor 150 to provide indications such as a cargo bin door opening (or more particularly, a failure of a cargo bin door 111 to close when the processor 150 expects (according to program logic of the autonomous vehicle cargo bin loading program code 161) that the cargo bin door 111 should be closed. Although shown at a top-right position with respect to each of the cargo bin doors 111, it should be appreciated that the RGB bin light(s) 110 may be disposed on any surface of the cargo bins 108 such as, for example, on a bottom right corner as shown in FIG. 2, a top right corner, in the center of the cargo bin door 111, etc. In other aspects, there may be more than one RGB bin light disposed at each cargo bin of the cargo bins 108, such as one on an exterior surface of the cargo bin doors 111, one or more on door frame portion as shown in FIG. 2, etc.

In some aspects, the vehicle 105 may include one or more DAPs 191 disposed on exterior vehicle surface(s) of the vehicle 105, and connected with a DAP controller (not shown in FIG. 1). In some aspects, the user 140 may have the option of entering the vehicle 105 and/or gaining access to the interior of the cargo bins 108 by typing in a personal identification number (PIN) on an exterior interface associated with a vehicle, and/or using a fob (not shown).

The computing system architecture of the automotive computer 145, VCU 165, and/or the vehicle cargo bin loading system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with an infotainment system 106 that may provide an interface for the navigation and NAV receiver 188, and the vehicle cargo bin loading system 107. The infotainment system 106 may include a touchscreen interface portion 104, and may include voice recognition features, biometric identification capabilities that can identify users based on facial recognition, voice recognition, fingerprint identification, or other biological identification means. In other aspects, the infotainment system 106 may provide user identification using mobile device pairing techniques, the infotainment system 106 may provide feedback and images showing an internal cargo bin view where one or more packages may require adjustment by the user 140.

FIG. 2 depicts an example cargo bin 109 having cargo 245 (e.g., a package) loaded therein, in accordance with one or more embodiments. The vehicle cargo bin loading system 107 includes the cargo bin 109, having integrated components disposed in communication with the automotive computer 145 via a data bus 215.

The cargo bin 109 may include a cargo bin door 111 movably fixed to a cargo bin storage area 218. The cargo bin door 111 may include one or more sensory devices rigidly fastened thereupon, including, for example, a radar 220, a camera 230, and a door latch 235. The door latch 235 may include a proximity sensor (not shown in FIG. 2) disposed in communication with the automotive computer 145 via the data bus 215. The proximity sensor may generate one or more cargo bin door closed status signals (not shown in FIG. 2) indicative that the cargo bin door 111 is closed or open. The cargo bin door 111 may include a spring load door that latches open with an electronic release associated with the door latch 235. For example, the processor 150 may cause the door latch 235 to actuate while the cargo bin door 111 is in a closed state, and the spring-loaded hinges (not shown in FIG. 2) may allow the cargo bin door 111 to spring open responsive to the actuation signal.

The cargo bin storage area 218 may have and/or include at its interior, one or more internal bin lights 240 configured to illuminate the interior of the cargo bin storage area 218. Although a single internal bin light 240 is shown in FIG. 2, it should be appreciated that any number of interior lights may be included such that all angles of the interior of the cargo bin storage area 218 may be viewable using the camera 230 while the cargo bin door 111 is in a closed state.

The DAP 191 may include a driver authentication user interface 205, and one or more output devices such as a sound exciter 210, a video interface (not shown in FIG. 2), or other user interface. The driver authentication user interface 205 may be and/or include a wireless keypad, touchscreen interface, or other type of interface, or included as part of another interface. The driver authentication user interface may be used by the vehicle cargo bin loading system 107 to interact with the user 140 by providing one or more user-selectable unique identifiers from a list, and by receiving personal identification numbers (PINs) and other non-personally identifying information from the user 140. In some embodiments, the interface may be a mobile device, a keypad, a wireless or wired input device, a vehicle infotainment system, and/or the like. Accordingly, it should be appreciated that, although the DAP 191 is described with respect to FIG. 2, the interface may alternatively be one or more other types of interfaces described above.

The RADAR 220 may be and/or include a radar-on-a-chip device having 1 micrometer or smaller dimensional accuracy in small spaces. For example, radars-on-a-chip have become an economical, accurate, and low-price processing module that may provide a RADAR angle 225 field of view from 30 degrees to 5 degrees or smaller. The processor 150 may cause the RADAR 220 disposed in the cargo bin storage area 218 (and more particularly, disposed on the cargo bin door 111 and/or other interior surfaces of the cargo bin 109) to determine a first dimensional measurement associated with a package position of the cargo 245, such as a bottom left corner of the box, determine a second dimensional measurement associated with the package position such as a top right corner of the box, and determine, based on the first dimensional measurement and the second dimensional measurement, that the package is not positioned adjacent to a bin back surface 260 of the cargo bin storage area 218, and/or be positioned at a front side of the cargo bin interior such that shifting during transport is minimized and fragile contents are not exposed to extreme position shifting.

The processor 150 may generate an output indicative that the package (cargo 245) requires repositioning by the user 140. The sound exciter 210 may output the generated signal such that it may be heard by the user 140, and an action may be taken to adjust the packages. In other aspects, the sensory devices (e.g., the camera 230) may provide data to the processor 150 indicative that the barcode or other cargo ID tag(s) 250 are visible or are not visible, where the processor 150 may cause the sound exciter 210 to output a message indicative that the barcode is not visible. The output may trigger an action by the user 140 to adjust the package(s) to be readable by the camera 230 and/or radar 220, to adjust the packages by placing them toward the bin back surface 260, and/or arrange the packages to be flat on a base surface of the cargo bin storage area 218 such that a maximum volume of packages (not shown) may be loaded in the cargo bin 109.

The camera 230 may be and/or include one or more RGB image sensory devices, infrared camera devices, monochrome camera devices, or other image sensory equipment known in the art. The camera 230 may be used by the processor(s) 150 to determine presence of the cargo 245, read label information, barcode information such as a cargo ID tag 250, and/or provide images that may be usable to determine package presence (e.g., whether the cargo 245 is loaded in the cargo bin storage area 218), cargo orientation 255, cargo dimensions, cargo dimensional volume, and/or other information. For example, the camera, RADAR 220, and the internal bin light 240 may be controllable by the processor 150 to measure dimensional information associated with the package (e.g., the cargo 245); determine, based on the dimensional information, that the cargo bin 109 is loaded at full capacity, and generate an output indicating whether the vehicle is ready for delivery of the packages (e.g., the cargo 245). The sensory and lighting hardware may determine, via the processor 150, that the barcode (e.g., the cargo ID tag 250) is not visible on the package; and causing to output a message indicative that the barcode is not visible. The processor may output the message via the sound exciter 210, which may be a speaker of any type suitable for outdoor use.

Figure 3:
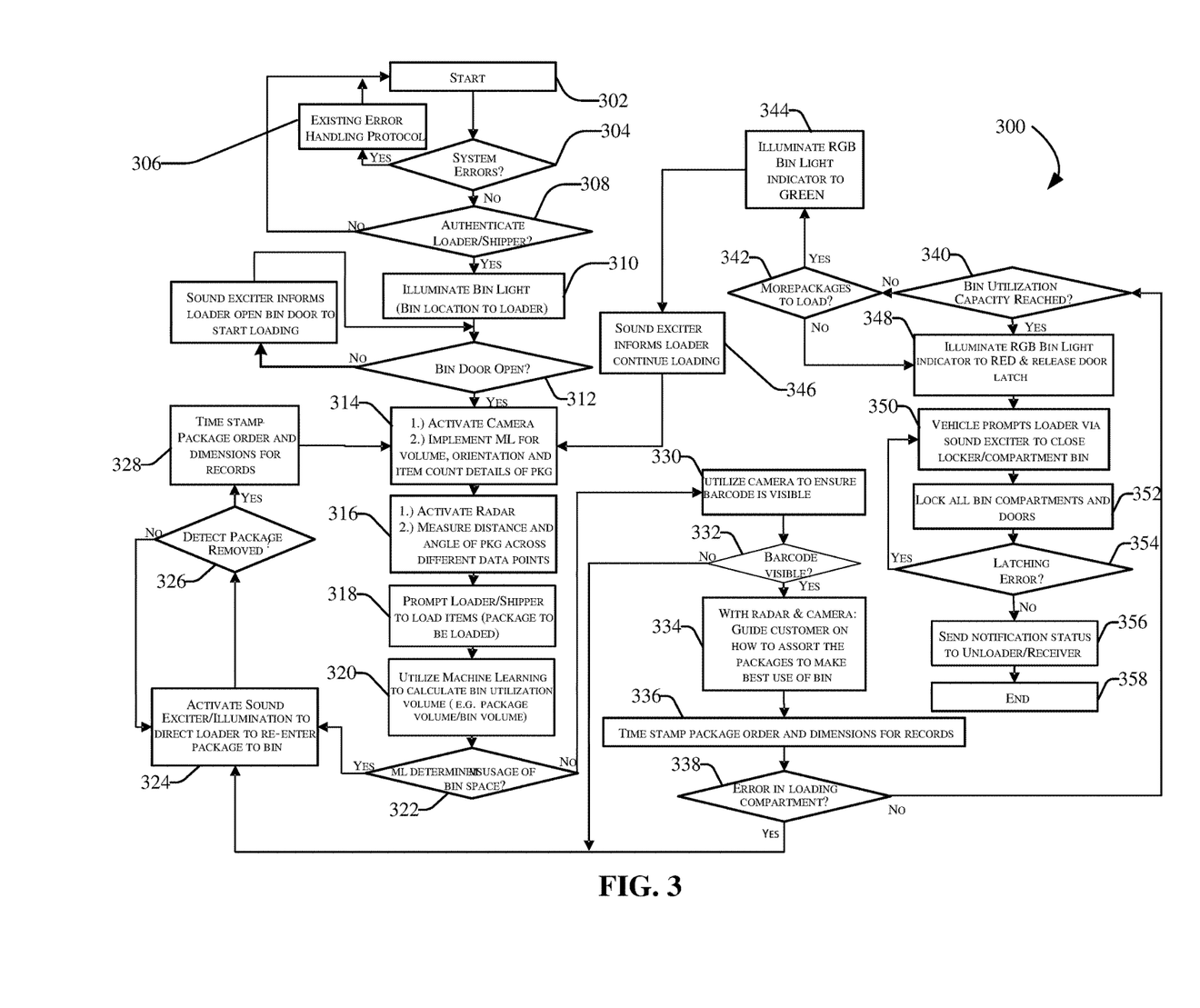
FIG. 3 illustrates an example process flow diagram for 300, in accordance with the present disclosure.

FIG. 3 illustrates an example process flow diagram 300 for controlling the vehicle cargo bin loading system 107 disposed on the vehicle 105, in accordance with the present disclosure.

The logic illustrated in FIG. 3 may begin with a starting step 302. At step 304 the processor 150 may determine whether there are any standing system errors which may indicate the need to restart the vehicle cargo bin loading system 107 (e.g., power down, and restart the system). Examples of system errors may be a standing fault code with one or more sensors, a processor 150 error, etc. Responsive to determining that there is a system error, at step 306 the system may follow one or more protocols for handling existing system errors.

At step 308, responsive to determining that there are no system errors, the processor may authenticate the loader/shipper (e.g., the user 140) via the DAP 191, or reiterate from the start step 302 until a loader/shipper is identified and authenticated by the processor 150.

At step 310, the processor 150 may illuminate a bin light (e.g., the RGB bin light 110) to identify the bin location to the loader for manual package loading.

At step 312, the processor 150 may determine whether a cargo bin door 111 is open, to allow loading of the cargo 245. Responsive to determining that the cargo bin door 111 is not open, the processor may generate output to the sound exciter 210 to inform the loader to open a bin door and start loading the cargo 245. Responsive to determining that the cargo bin door 111 is open, at step 314 the processor 150 may activate the camera 230 and implement the machine learning algorithm (e.g., the autonomous vehicle cargo bin loading system program code 161) to determine package volume, package orientation, and determine an item count and other details associated with the package (e.g., the cargo 245).

At step 316, the processor 150 may activate the RADAR 220, and measure the distance and angle of the package (e.g., the cargo orientation 255) across various data points associated with the cargo 245. By measuring distances and angles of the package, the vehicle cargo bin loading system 107 may determine a package orientation inside of the cargo bin 109, determine an estimated package volume and position within the cargo bin 109, and determine if the package is oriented in the bin in a favorable way to conserve space and optimize the volume of the storage area for storing additional packages.

At step 318, the processor 150 may prompt the loader/shipper (e.g., the user 140) to load the items (such as, for example, the cargo 245).

At step 320, the processor may utilize machine learning algorithms in the 160 to calculate bin utilization volume based on the measurements from step 316.

At step 322, the machine learning algorithm may determine usage of the bin space, and evaluate whether the bin space has been used efficiently or has been misused due to poorly loaded packages and cargo 245.

At step 326, the processor 150 may determine whether the package has been removed, and reiterate the sound/illumination step 324 responsive to determining that the package has not been repositioned.

Responsive to determining that the package has been repositioned, at step 328, the processor 150 may time stamp the package order and dimensions to a record (not shown in FIG. 3), which may be, for example, a data structure stored in the memory 155, and proceed to iterate again to step 314.

Responsive to determining, at step 322 that the bin storage space has not been misused, at step 330 the processor 150 may utilize the camera 230 to ensure that the barcode (e.g., the cargo ID tag 250) is visible.

At step 332, the processor may determine, using the input from the camera 230, whether the barcode is visible. Responsive to determining that the code was visible, at step 334 the processor 150 may guide customer(s) on how to sort the packages/cargo 245 to make the best use of the cargo bin 109 space. The processor 150 may utilize the RADAR 220 and camera 230 to receive visual and sensory feedback while instructing the user 140 on proper package placement using the DAP user interface 205.

Responsive to determining that the barcode is not visible, the processor may iterate again to step 324 to activate the sound exciter 210 or other output to cause the user 140 to re-enter the cargo 245.

At step 336, responsive to the user 140 arranging the cargo 245 for proper positioning, the processor 150 may time stamp the package order and dimensions for a persistent record.

At step 338, the processor 150 may determine whether there are any errors in the cargo bin 109, and responsive to determining that errors are present (e.g., the cargo 245 is not positioned against the back cargo wall, crooked, not positioned toward the front of the vehicle 105, etc.) the processor may again reiterate to step 324.

Responsive to determining that no errors are present, at step 340, the processor 150 may evaluate whether the bin utilization capacity is reached. The processor may perform this step by estimating a package volume contained in the cargo bin 109, compare that volume to the volume capacity (known by the processor) of the cargo bin 109, and determine whether the capacity has been reached.

Responsive to determining that the cargo bin storage capacity has not been reached, at step 342 the processor determines whether there are more packages to be loaded. This may include parsing a manifest document (not shown in FIG. 3) indicative of packages/cargo intended to be loaded on the vehicle 105. Responsive to determining that there are more packages to be loaded, at step 344, the processor may illuminate the RGB bin light 110 indicator to a green color that may indicate the ability to load more packages in that respective bin. At step 346, the processor 150 may trigger the sound exciter 210 to output a sound that informs the user 140 to continue loading packages, and proceeds to step 314 for iteratively stepping through the machine learning package orientation and volume determination steps.

Looking again at step 342, the processor 150 may determine that there are no more packages to be loaded on the vehicle 105. The processor 150 may proceed to step 348 and cause the RGB bin light 110 to illuminate red and release the door latch. The door latch may then release, and the spring-loaded bin door 111 may open.

At step 350, the processor may cause output via the sound exciter 210 to close the cargo bin door 111, lock all cargo bin compartments and doors by actuating the door latch 235 (and other door latches not shown in FIG. 3) at step 352.

At step 354, the processor 150 may determine whether there are any door latching errors.

Responsive to determining that there are door latching errors, the processor 150 may reiterate through step 350 to prompt the user 140 to close the cargo bin door(s) 111.

Responsive to determining that there are no door latching errors, the processor 150 may send a notification status to the unloader/receiver (e.g., the user 140) at step 356, and end the process at step 358.

Responsive to determining that the bin space has been misused, at step 324, the processor 150 may cause the sound exciter 210 to output an indication to direct the user 140 to re-enter the cargo 245. In another example embodiment, the processor 150 may cause a visual output on the DAP user interface 205 to indicate this instruction.

Figure 4:
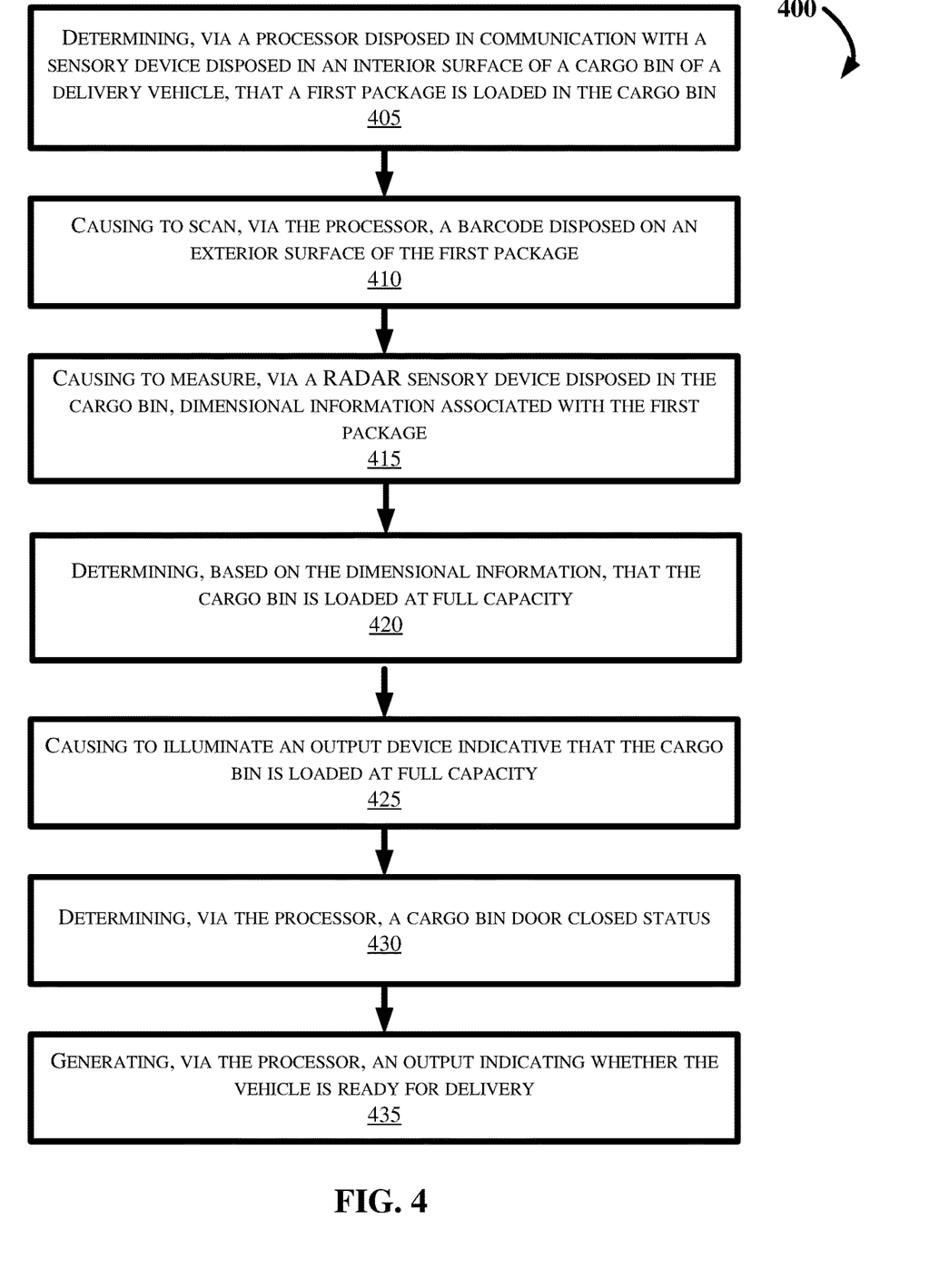
FIG. 4 depicts a flow diagram of an example method for controlling an autonomous vehicle cargo bin loading system in accordance with the present disclosure.

FIG. 4 is a flow diagram of an example method 400 for controlling an autonomous cargo bin loading system, according to the present disclosure. FIG. 4 may be described with continued reference to prior figures, including FIGS. 1-3. The following process is exemplary and not confined to the steps described hereafter. Moreover, alternative embodiments may include more or less steps that are shown or described herein, and may include these steps in a different order than the order described in the following example embodiments.

Referring first to FIG. 4, at step 405, the method 400 may commence with determining, via a processor disposed in communication with a sensory device disposed in an interior surface of a cargo bin of a delivery vehicle, that a first package is loaded in the cargo bin. This step may include determining, via the processor, a cargo bin door closed status. This step may further include generating, via the processor, an output indicative that a cargo bin door is not closed.

At step 410, the method 400 may further include causing to scan, via the processor, a barcode disposed on an exterior surface of the first package. This step may include determining, via the processor, that the barcode is not visible on the first package; and causing to output, via the processor, a message indicative that the barcode is not visible. In other aspects, this step may further include causing to output an audible alert via a sound exciter disposed in communication with the processor.

At step 415, the method 400 may further include causing to measure, via a RADAR sensory device disposed in the cargo bin, dimensional information associated with the first package. This step may include causing the RADAR sensory device disposed in the cargo bin to determine a first dimensional measurement associated with a first package position and a second dimensional measurement associated with the first package position; determining, based on the first dimensional measurement and the second dimensional measurement that the first package is not positioned adjacent to a bin back surface; and generating, via the processor, an output indicative that the first package requires repositioning.

At step 420, the method 400 may further include determining, based on the dimensional information, that the cargo bin is loaded at full capacity. This step may include comparing, via the processor, the that the first package is not positioned adjacent to the bin back surface, determining, via the processor, a storage capacity volume associated with the storage bin, determining a volume associated with a first package; comparing the storage capacity volume associated with the storage bin with a volume associated with the first package, determining that there is a second package loaded in the storage bin, determining a volume associated with the second package; and determining that the cargo bin is loaded at full capacity based on the volume of the first package and the second package.

In other aspects, step 420 may further include determining, based on the dimensional information, that the cargo bin is loaded at full capacity. This step may include comparing, via the processor, the that the first package is not positioned adjacent to the bin back surface, determining, via the processor, a storage capacity volume associated with the storage bin, determining a volume associated with a first package, determining that there is not a second package loaded in the storage bin, and determining that the cargo bin is loaded at full capacity based on the volume of the first package.

At step 425, the method 400 may further include causing to illuminate an output device indicative that the cargo bin is loaded at full capacity. This step may include sending, via the processor, an actuation signal to a visual interface or a sound interface. In one example embodiment, the sound interface is a sound exciter.

At step 430, the method 400 may further include determining, via the processor, a cargo bin door closed status. This step may include receiving, via the processor, a signal from a door latch mechanism associated with the cargo bin door, and determining, based on a return signal from the cargo door latch mechanism that the cargo bin door is not closed.

At step 435, the method 400 may further include generating, via the processor, an output indicating whether the vehicle is ready for delivery. This step may include sending, via the processor and to an output device, an indication that the vehicle is ready to proceed to the route for package delivery. This step may include generating a visual indication, generating an audible indication, or generating both of an audible indication and a visual indication. The audible indication may be output via a sound exciter such as a speaker associated with the system. The visual indication may be a written message or icon indicative of a vehicle ready condition.

Embodiments of the present disclosure may utilize radar and camera sensors in the storage bins of a delivery vehicle to enhance the loading process. The loading process has the following advantages: Packages that may not pushed all the way to the back of cargo bin storage areas may be immediately recognized by the system, and the package loader may be automatically notified by audio output and/or visual output to rectify the situation to make room for added packages in the same bin that are going to same address. This may prevent or mitigate inefficient use of valuable bin storage space. Packages are positioned so at bar code can be read after placement allowing vehicle to verify that the correct package was actually put in the bin by the loader/customer. Moreover, packages tilted on an angle are immediately corrected, thus allowing for tighter packing in bin and less shifting during transit. In other aspects, packages may be loaded flat against a "Front of Vehicle" side of the cargo storage bins, which may minimize shifting in case of rapid braking (other rapid maneuvers by the self-driving system such as rapid acceleration and turning) can be avoided. When a small package is placed in a larger bin (because the smaller package is the last remaining package in the storage bin) and is coded in the system as "fragile," the vehicle can make the decision to reduce its forward and turning acceleration in order to minimize shifting.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a delivery vehicle cargo bin loading system disposed on a vehicle, comprising:
    determining, via a processor disposed in communication with a sensory device disposed in an interior surface of a cargo bin of the delivery vehicle, that a first package is loaded in the cargo bin;
    causing to scan, via the processor, a barcode disposed on an exterior surface of the first package;
    causing to measure, via a RADAR sensory device disposed in the cargo bin, dimensional information associated with the first package;
    determining, based on the dimensional information, that the cargo bin is loaded at full capacity;
    causing to illuminate an output device indicative that the cargo bin is loaded at full capacity;
    determining, via the processor, a cargo bin door closed status; and
    generating, via the processor, an output indicating whether the delivery vehicle is ready for delivery.

2. The method according to claim 1, wherein determining that the first package is loaded in the cargo bin of the delivery vehicle comprises:
    determining, via a trained machine learning algorithm, that the first package is loaded in the cargo bin.

3. The method according to claim 1, further comprising, determining, via the processor, that the barcode is not visible on the first package; and
    causing to output, via the processor, a message indicative that the barcode is not visible.

4. The method according to claim 3, further comprising:
    causing to output an audible alert via a sound exciter disposed in communication with the processor.

5. The method according to claim 1, wherein causing to measure the dimensional information associated with the first package comprises:
    causing the RADAR sensory device disposed in the cargo bin to determine a first dimensional measurement associated with a first package position and a second dimensional measurement associated with the first package position;
    determining, based on the first dimensional measurement and the second dimensional measurement that the first package is not positioned adjacent to a bin back surface; and
    generating, via the processor, an output indicative that the first package requires repositioning.

6. The method according to claim 5, further comprising, determining, via the processor, that a second package is loaded in the cargo bin; and
generating, via the processor, an output indicative that the first package and the second package require a change in position in the cargo bin.

7. The method according to claim 1, wherein determining that the cargo bin door closed status further comprises:
generating, via the processor, an output indicative that a cargo bin door is not closed.

8. A cargo bin loading system disposed on a delivery vehicle, comprising:
a processor; and
a memory for storing executable instructions, the processor programmed to execute the instructions to:
determine, via a sensory device disposed in an interior surface of a cargo bin of the delivery vehicle, that a first package is loaded in the cargo bin;
cause to scan a barcode disposed on an exterior surface of the first package;
cause to measure, via a RADAR sensory device, disposed in the cargo bin and in communication with the processor, dimensional information associated with the first package;
determine, based on the dimensional information, that the cargo bin is loaded at full capacity;
cause to illuminate an output device indicative that the cargo bin is loaded at full capacity;
determine, via the processor, a cargo bin door closed status; and
generate an output indicating whether the delivery vehicle is ready for delivery.

9. The system according to claim 8, wherein the processor is further programmed to determine that the first package is loaded in the cargo bin of the delivery vehicle by executing the instructions to:
determine, via a trained machine learning algorithm, that the first package is loaded in the cargo bin.

10. The system according to claim 8, wherein the processor is further programmed to execute the instructions to:
cause a sensory device in communication with the processor to scan the barcode disposed on an exterior surface of the first package;
determine that the barcode is not visible on the first package; and
cause to output a message indicative that the barcode is not visible.

11. The system according to claim 10, wherein the processor is further programmed to execute the instructions to:
cause to output an audible alert via a sound exciter disposed in communication with the processor.

12. The system according to claim 8, wherein the processor is further programmed to cause to measure the dimensional information associated with the first package by executing the instructions to:
cause the RADAR sensory device disposed in the cargo bin to determine a first dimensional measurement associated with a first package position and a second dimensional measurement associated with the first package position;
determine, based on the first dimensional measurement and the second dimensional measurement that the first package is not positioned adjacent to a bin back surface; and
generate an output indicative that the first package requires repositioning.

13. The system according to claim 12, wherein the processor is further programmed to execute the instructions to:
determine that a second package is loaded in the cargo bin; and
generate an output indicative that the first package and the second package require a change in position in the cargo bin.

14. The system according to claim 8, wherein the processor is further programmed to determine that the cargo bin door closed status by executing the instructions to:
generate an output indicative that a cargo bin door is not closed.

15. A non-transitory computer-readable storage medium in a delivery vehicle, the computer-readable storage medium having instructions stored thereupon which, when executed by a processor, cause the processor to:
determine, via a sensory device disposed in an interior surface of a cargo bin of the delivery vehicle, that a first package is loaded in the cargo bin;
causing to scan a barcode disposed on an exterior surface of the first package;
causing to measure, via a RADAR sensory device disposed in the cargo bin and in communication with the processor, dimensional information associated with the first package;
determining, based on the dimensional information, that the cargo bin is loaded at full capacity;
causing to illuminate an output device indicative that the cargo bin is loaded at full capacity;
determining, via the processor, a cargo bin door closed status; and
generating an output indicating whether the delivery vehicle is ready for delivery.

16. The non-transitory computer-readable storage medium according to claim 15, having further instructions stored thereupon to determine that the first package is loaded in the cargo bin of the delivery vehicle by causing the processor to:
determine, via a trained machine learning algorithm, that the first package is loaded in the cargo bin.

17. The non-transitory computer-readable storage medium according to claim 15, having further instructions stored thereupon to:
cause a sensory device in communication with the processor to scan the barcode disposed on an exterior surface of the first package;
determine that the barcode is not visible on the first package; and
cause to output a message indicative that the barcode is not visible.

18. The non-transitory computer-readable storage medium according to claim 17, having further instructions stored thereupon to cause the processor to:
cause to output an audible alert via a sound exciter disposed in communication with the processor.

19. The non-transitory computer-readable storage medium according to claim 15, having further instructions stored thereupon to cause to measure the dimensional information associated with the first package by causing the processor to:
cause the RADAR sensory device disposed in the cargo bin to determine a first dimensional measurement associated with a first package position and a second dimensional measurement associated with the first package position;

determine, based on the first dimensional measurement and the second dimensional measurement that the first package is not positioned adjacent to a bin back surface; and generate an output indicative that the first package requires repositioning.

20. The non-transitory computer-readable storage medium according to claim 19, having further instructions stored thereupon to:

determine that a second package is loaded in the cargo bin; and generate an output indicative that the first package and the second package require a change in position in the cargo bin.

* * * * *